United States Patent [19]
Katsumata et al.

[11] Patent Number: 5,561,572
[45] Date of Patent: Oct. 1, 1996

[54] TAPE GUIDE WITH LUBRICANT FLOW PREVENTING MEANS IN A SIGNAL RECORDING ARRANGEMENT

[75] Inventors: Hiroshi Katsumata; Hiroaki Momiyama; Hirohisa Koga; Takashi Sasaya, all of Kanagawa, Japan

[73] Assignee: Sony Corporation, Tokyo, Japan

[21] Appl. No.: 394,632

[22] Filed: Feb. 27, 1995

[30]    Foreign Application Priority Data

Feb. 28, 1994  [JP]  Japan ..................................... 6-029420

[51] Int. Cl.$^6$ ................................................. G11B 15/60
[52] U.S. Cl. ......................................................... 360/130.2
[58] Field of Search ............... 360/83–85, 130.2–130.24

[56]              References Cited
           U.S. PATENT DOCUMENTS 4,316,225  2/1982  Maruyama .......................... 360/130.22

*Primary Examiner*—A. J. Heinz
*Attorney, Agent, or Firm*—Ronald P. Kananen

[57]                ABSTRACT

A tape guide mechanism includes absorbent members retained by a mounting structure so positioned as to absorb lubricant leakage from bearing portions of the tape guide mechanism to outer tape contact surfaces of a roller guide portion of flange portions thereof. The lubricant absorbing members may be mounted at a plurality of locations so as to prevent leakage of lubricant along an inner wall of the cylindrical roller guide portion of the tape guide, leakage along an outer surface of a support shaft of the tape guide, or leakage along inner or outer surfaces of a bearing pressing member provided at ends of the tape guide mechanism adjacent the flange portions thereof.

25 Claims, 14 Drawing Sheets

TAPE GUIDE WITH LUBRICANT FLOW PREVENTING MEANS IN A SIGNAL RECORDING ARRANGEMENT

BACKGROUND OF THE INVENTION

1. Field of the Invention

As is known the height of magnetic tape moving during operation of a tape recording/playback device, such as a video tape recorder (VTR) or the like, is subject to fluctuation. Thus a plurality of tape guide members including flanges for limiting movement of the tape in the width direction thereof are included in a tape drive mechanism to stabilize tape motion.

2. Description of the Related Art

The present invention relates generally to a tape guide mechanism for use in such as video tape recorders (VTRs), and various types of rotary head tape devices.

Conventional structure of such tape guide arrangements will be described hereinbelow with reference to FIGS. 1–4 wherein like reference numerals will be used to describe like parts. In FIG. 3 a circular bearing 51 is disposed around a main shaft 31. Upper and lower sides of the shaft are respectively retained by upper and lower bearings 37, 38. At ends of the shaft 31 flanges 40, 41 are respectively provided.

Referring now to FIG. 1, generally, in such magnetic tape recording and/or reproducing apparatus utilizing such tape loading arrangements as described above, a pivotal arm 32 is moveably mounted on the base plate (not shown) for facilitating tape loading. Projecting from a distal end of the arm 32 a support shaft 31 is provided having a threaded end portion 31a.

At an upper side of the support shaft 31 a flange member 33 is provided having an enlarged circumferential ring portion 35 and a shaft section 34 projected from a lower side thereof. The threaded and portion 31a of the support shaft 31 is engaged with a threaded opening 34a provided through said flange member 33 and the shaft section 34 thereof.

A cylindrical roller guide 36 is disposed around said support shaft 31 to be held between a base of the support shaft 31 and the ring portion 35 of the flange 33 so as to be disposed coaxially with the support shaft 31 and to be rotatable relative thereto. The cylindrical roller guide 36 includes an outer tape contact surface 36a.

A cylindrical bearing pressing member 43 is disposed coaxially with the support shaft 31 between the support shaft 31 and the roller guide 36. The bearing pressing member meets the upper flange 40 at an upper side thereof and the upper bearing 37 at the lower side thereof.

The upper and lower sides of the support shaft 31 are respectively encircled by upper and lower bearings 37, 38. At upper and lower ends of the cylindrical roller guide 36 flanges 40, 41 are respectively provided retaining the upper and lower bearings 37, 38 therebetween. Fitting around a lower side of the support shaft 31 a flange spacer 44 is provided comprising a cylindrical spacer portion 44a and a flange ring portion 44b. Also, the flange spacer 44 is interposed between the lower edge of the lower flange 41 and the arm 32.

Further, a coil spring 45 is provided which is fitted around a base portion of the support shaft 31 between the arm 32 and the flange ring portion 44b of the flange spacer 44. The coil spring 45 pushes the flanges 40 and 41 in the upward direction and applies upward biasing pressure on the components of the tape guide mechanism engaged between the flange spacer and the flange 33. Further adjustment spacers 46, 47 may be normally provided in such a tape guide mechanism. The upper adjustment 46 spacer is positioned between a lower side of the bearing pressing member 45 and the upper bearing 37 while the lower adjustment spacer is positioned between an upper side of the lower flange 41 and the lower bearing 38.

As may be seen in FIG. 4, each of the shaft receiving portions 37, 38 includes an inner ring 62, and outer ring 63, a plurality of balls 64, ball support portions 65 and a sheild member 66. Further, in order that excessive frictional heat is not generated according to rotation of the balls 64, a lubricant such as grease (not shown) is generally disposed in the bearings 37, 38.

According to provision of such lubricant, high performance may be obtained with smooth operation even during high speed rotation of the tape guide.

However, according to such conventional tape guide structure, over prolonged use leakage of such grease or other lubricant may occur between the sheild 66 and the inner ring 62 and/or between the sheild 66 and the outer ring 63. In other words, the lubricant may be caused to move in the directions of the arrows as shown in FIG. 4 and the performance of the tape guide mechanism is degraded and it is possible that lubricant may be contacted to the tape surface, possibly damaging the magnetic tape.

Thus, movement of lubricant in the directions as indicated in arrows a of FIG. 2 and arrows b–d or FIG. 3 may occur. Thus it has been required to provide a tape guide member in which lubricated bearings and the like are disposed such that migration of lubricant from the bearing to a tape contact surface such as the surface 36a of the roller guide or the inner sides off the flanges 40, 41, cannot occur.

SUMMARY OF THE INVENTION

It is therefore a principal object of the present invention to overcome the drawbacks of the related art.

It is a further object of the present invention to provide a tape guide member in which migration of lubricant from bearing portions thereof to tape contact surfaces thereof is surely prevented.

In order to accomplish the aforementioned and other objects, a tape guide mechanism for a signal recording apparatus is provided, comprising: a support shaft having upper and lower ends and projected from a mounting base; an upper flange engaged with a distal end of the support shaft and including a tape contact portion; a lower flange coaxially disposed around a lower side of the support shaft proximate the base and including a tape contact portion; a cylindrical roller guide disposed coaxially with the support shaft and rotatable relative thereto, disposed around the support shaft between the upper and lower flanges, the cylindrical roller guide including an outer tape contact surface and an inner wall; bearing means provided between an outer wall of the support shaft and the inner wall of the cylindrical roller guide; spring means provided between the base and a lower side of the lower flange so as to apply upward biasing pressure on components of the tape guide mechanism engaged between the upper and lower flanges; and annular lubricant flow prevention means provided between the bearing means and upper and lower ends of the tape guide mechanism, the lubricant flow prevention means positioned so as to intercept flow of lubricant between the bearing means and the tape contact surfaces of the upper and lower flanges and the cylindrical roller guide.

According to another aspect of the present invention, there is provided a signal recording and/or playback apparatus utilizing magnetic tape, comprising: a head drum rotatably mounted on the apparatus and operable in a least one of a first mode for recording information signals to the magnetic tape and a second mode for reading information signals from the magnetic tape; at least one cylindrical tape guide mechanism rotatably disposed proximate the head drum and active to guide the magnetic tape along a predetermined path of tape travel, the tape guide mechanism including: a support shaft having upper and lower ends and projected from a mounting base; an upper flange engaged with a distal end of the support shaft and including a tape contact portion; a lower flange coaxially disposed around a lower side of the support shaft proximate the base and including a tape contact portion; a cylindrical roller guide disposed coaxially with the support shaft and rotatable relative thereto, disposed around the support shaft between the upper and lower flanges, the cylindrical roller guide including an outer tape contact surface and an inner wall; bearing means provided between an outer wall of the support shaft and the inner wall of the cylindrical roller guide; spring means provided between the base and a lower side of the lower flange so as to apply upward biasing pressure on components of the tape guide mechanism engaged between the upper and lower flanges; and annular lubricant flow prevention means provided between the bearing means and upper and lower ends of the tape guide mechanism, the lubricant flow prevention means being mounted on the inner wall of the cylindrical roller guide and positioned so as to intercept flow of lubricant between the bearing means and the tape contact surfaces of the upper and lower flanges and the cylindrical roller guide.

DESCRIPTION OF THE PREFERRED EMBODIMENT

Referring to the accompanying drawings, a preferred embodiment of the invention will be described hereinbelow in detail.

A first preferred embodiment of the invention will be explained hereinbelow in detail. The first embodiment is drawn to a tape guide and signal recording arrangement such as utilized in VTRs and the like.

In the tape guide and signal recording arrangement according to the invention a fluid circuit provided for lubrication of the moving parts of the mechanism is prevented from leaking to an outer roller guide or flange surface of the tape guide.

Figure 5:
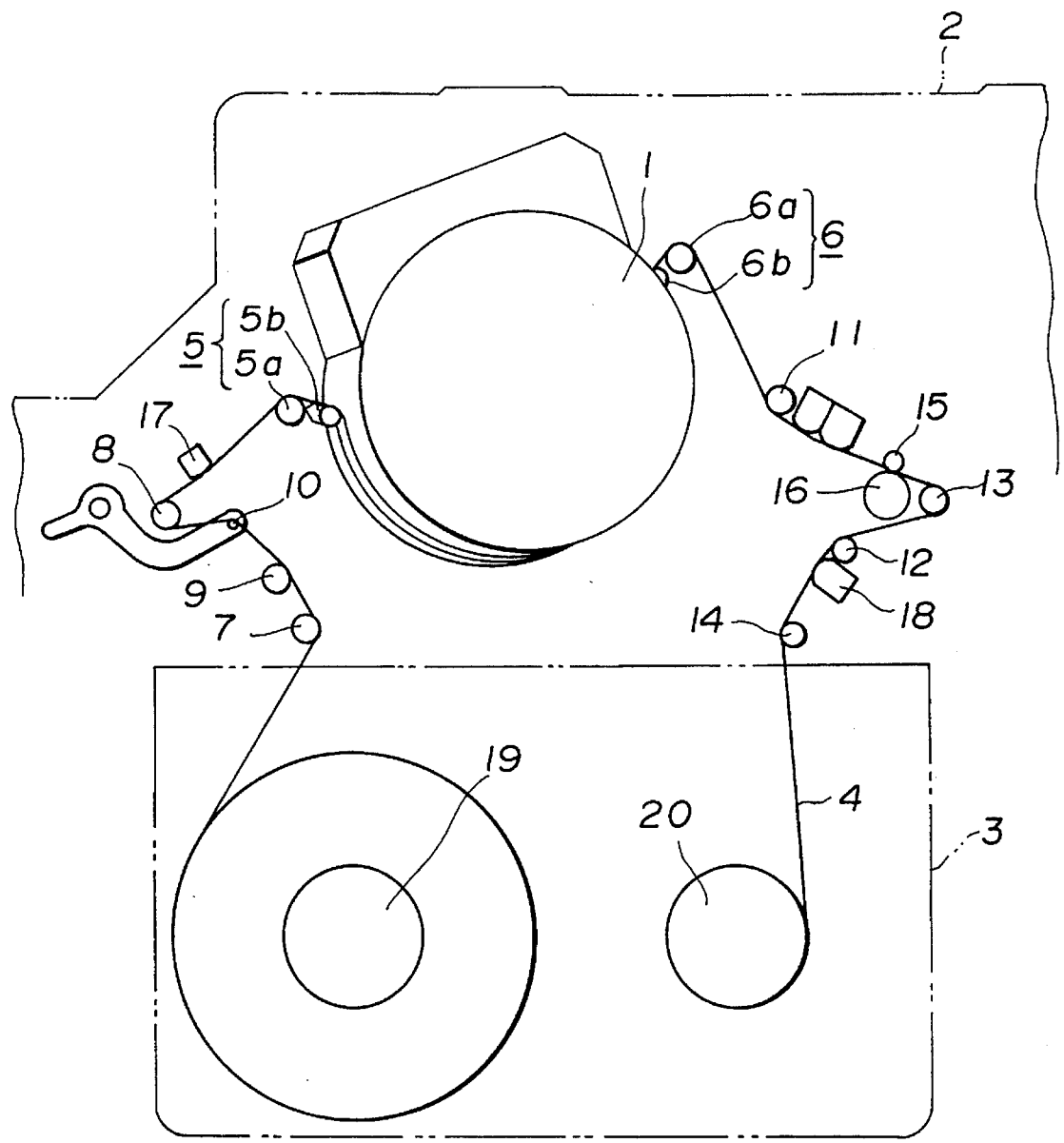
FIG. 5 is a schematic view of a tape loading arrangement and a magnetic tape cassette.

Referring to FIG. 5, it may be seen that a tape loading mechanism in which the tape guide and signal recording arrangement according to the invention may be utilized includes a rotating magnetic head drum 1 mounted on a base plate 2. Magnetic tape 4 from a tape cassette 3 is wound around the circumference of the head drum 1 and wound between reels 19 and 20 of the tape cassette 3 during recording and/or playback operation. Tape guides 5 and 6 are provided respectively on each side of the head drum 1. The tape guides 5 and 6 include perpendicular guide members 5a, 6a and inclined guide members 5b, 6b. Also, supply side roller guides 7 and 8, supply side fixed guides 9 and 10 as well as take-up side fixed guides 11 and 12 and take-up side roller guides 13 and 14 also comprise the tape loading arrangement. A capstan 15, pinch roller 16, erase head 17 and a confidence head 18 may also be included.

The magnetic tape 4 is moved according to operation of the tape guides 5 and 6 and tape reel capstans (not shown) which are projected from the base plate 2 to support the tape reels 19 and 20 of the tape cassette 3. Thus, according to operation of the the supply side tape guide 5 or the take-up side tape guide 6 the magnetic tape 4 may be moved around the head drum 1 in forward and reverse directions.

Figure 6A:
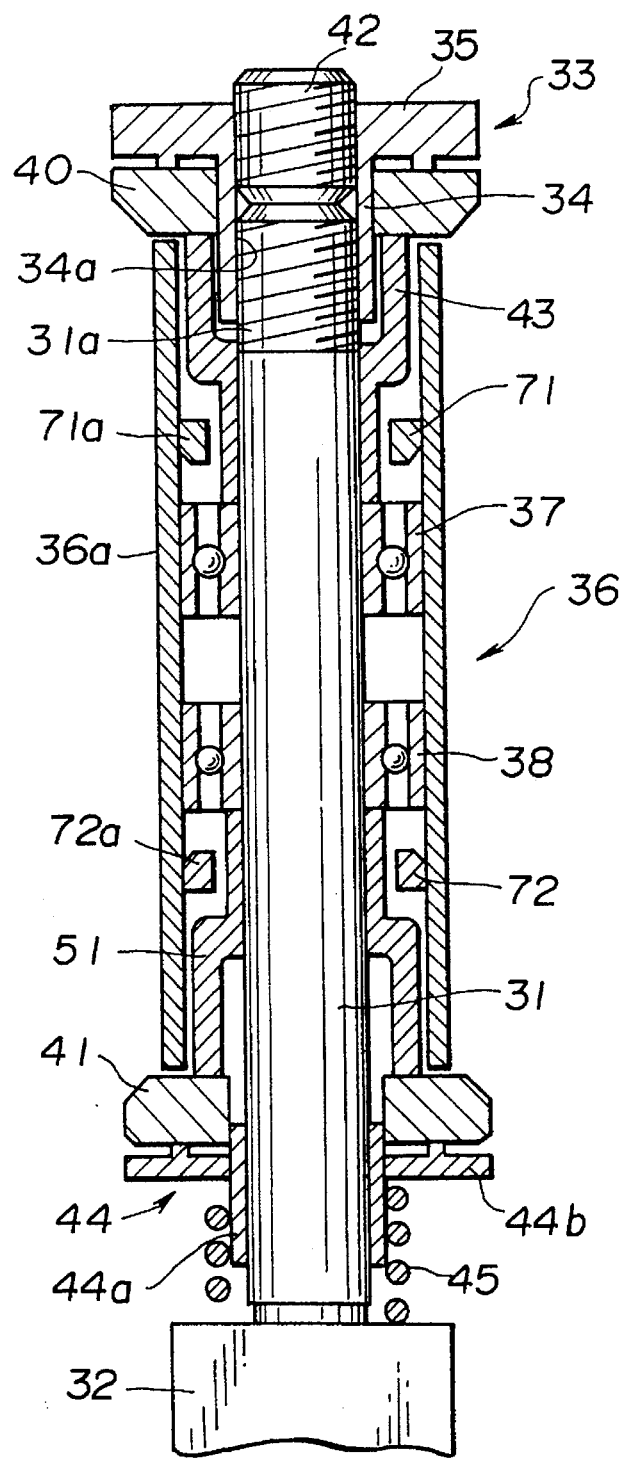
FIGS. 6(a) and 6(b) show a preferred embodiment of a tape guide mechanism according to the the invention.
Figure 6B:
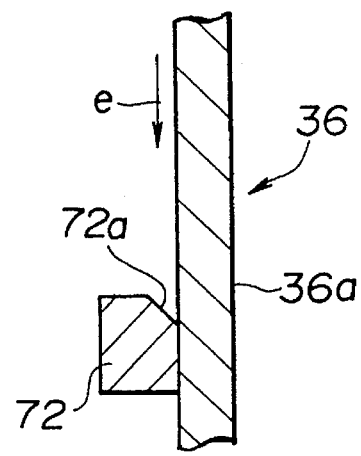

Referring now to FIG. 6(a) and 6(b), a cross-sectional view and an enlarged cross-sectional view of a tape guide and signal recording arrangement according to the invention are shown. In the subsequent embodiments of FIGS. 7–14, like reference numerals will be used for like parts.

Figure 1:
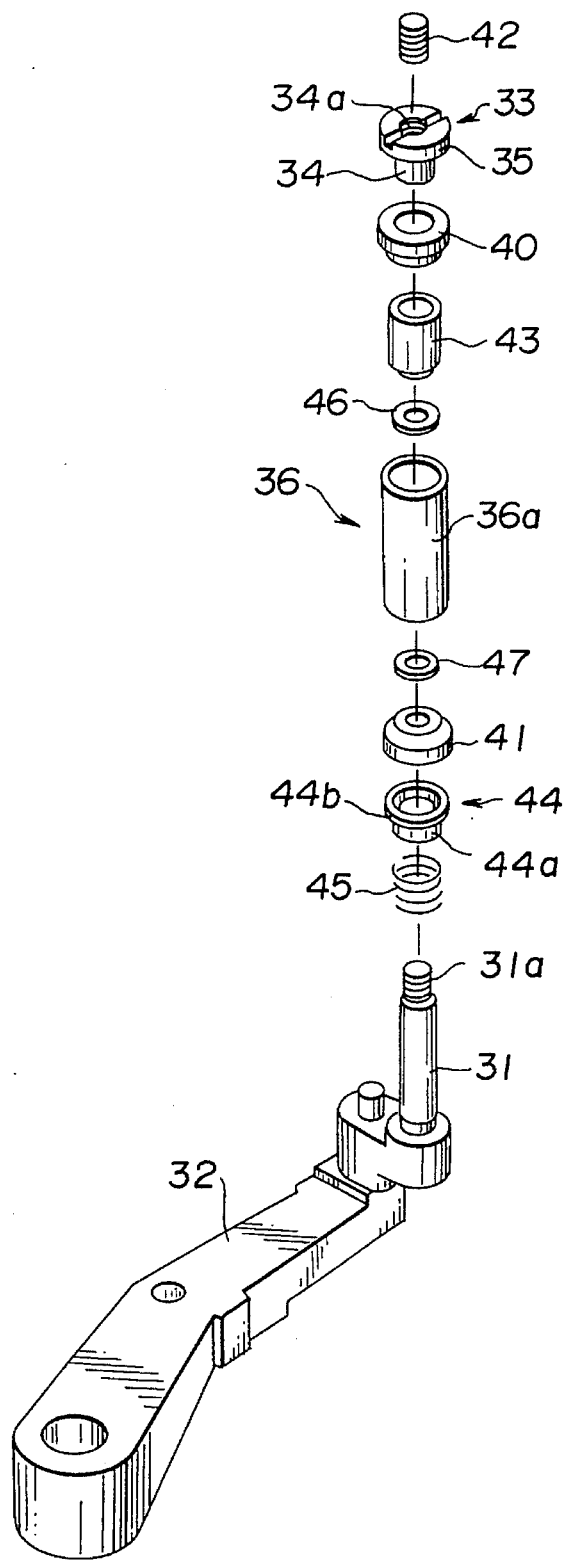
FIG. 1 is an exploded perspective view of a tape guide mechanism utilized in a tape loading arrangment.
Figure 2:
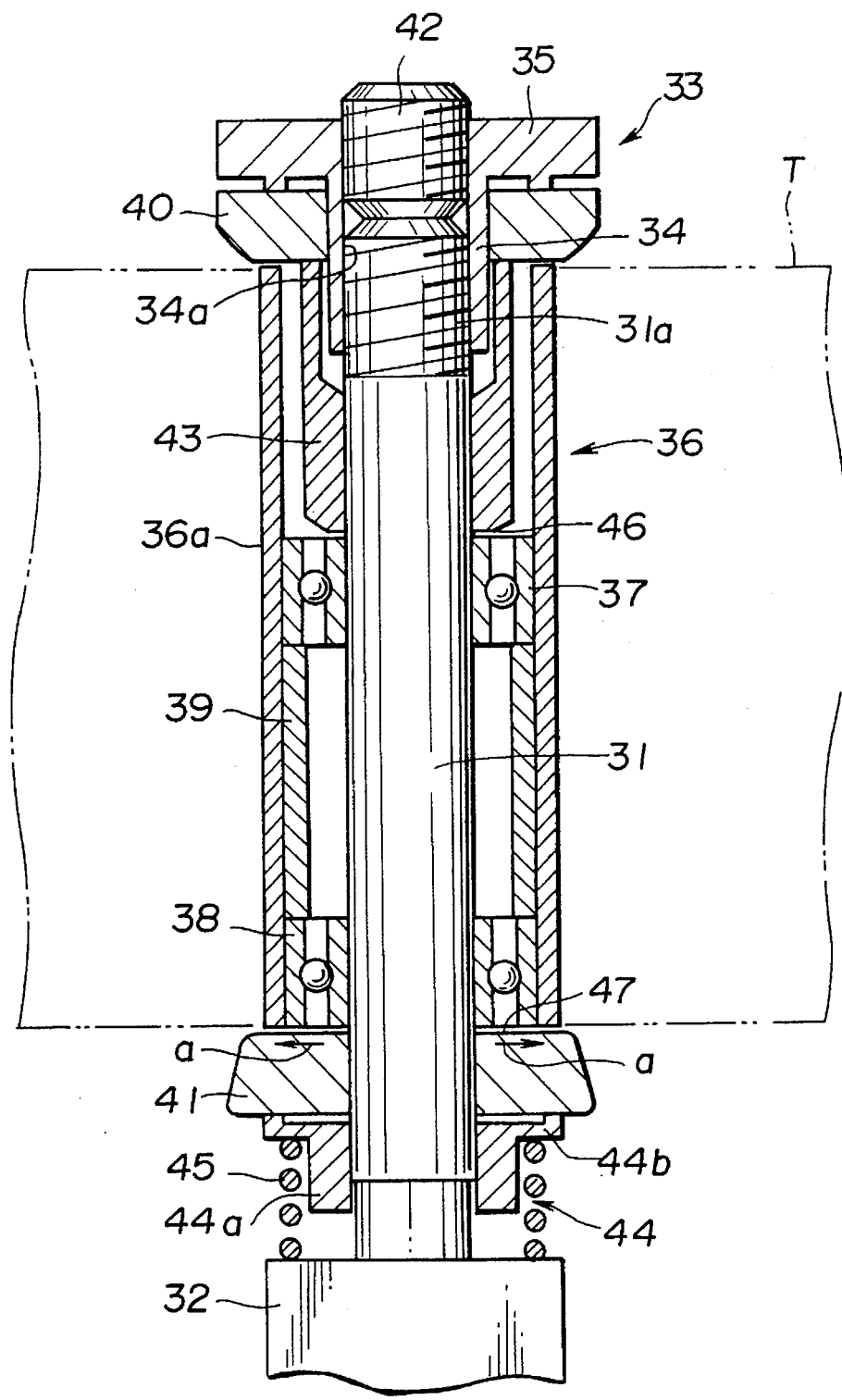
FIG. 2 shows a cross-sectional view of a conventional tape guide mechanism.
Figure 3:
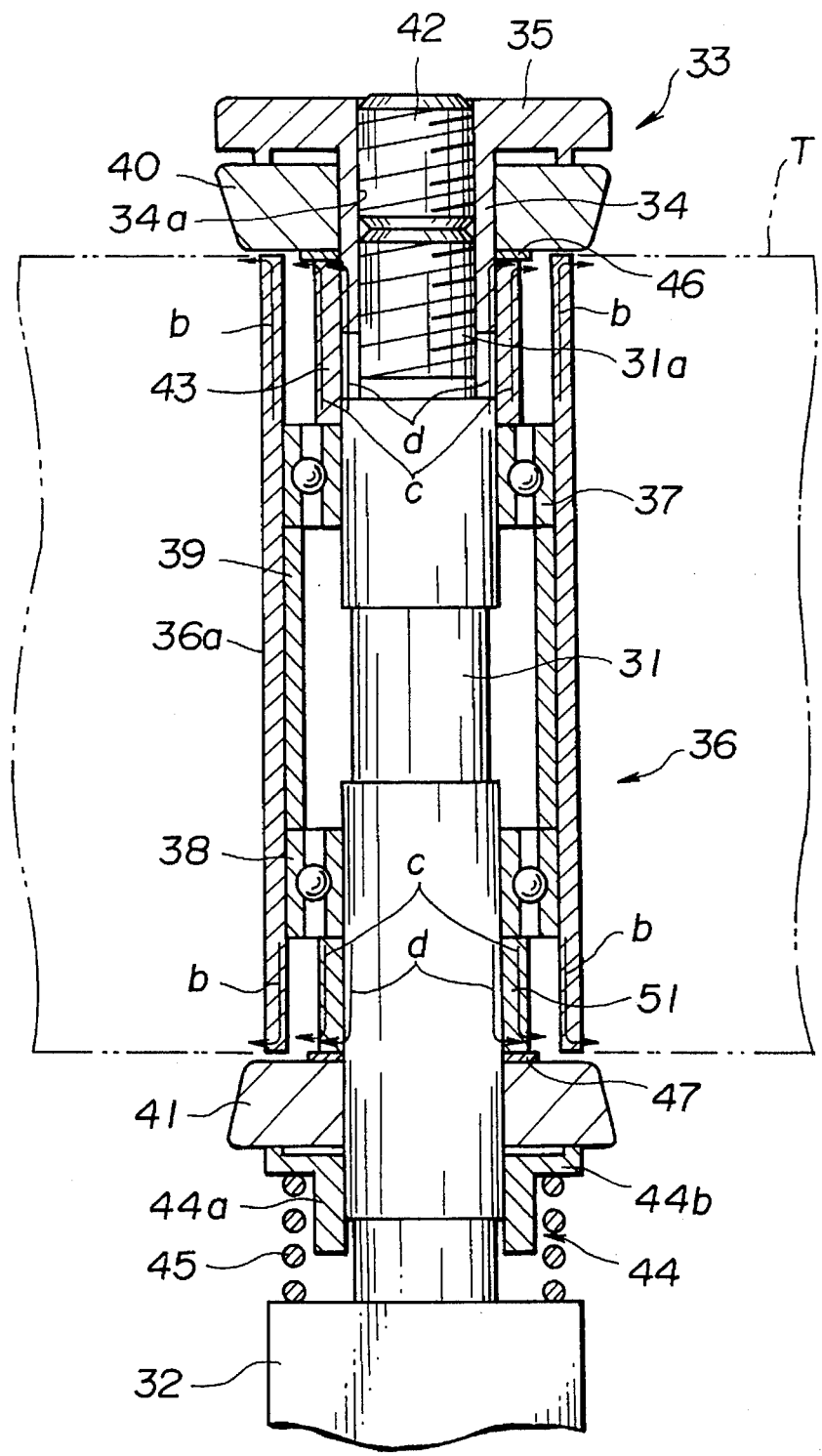
FIG. 3 is a cross-sectional view of an alternative construction of a conventional tape guide mechanism.
Figure 4:
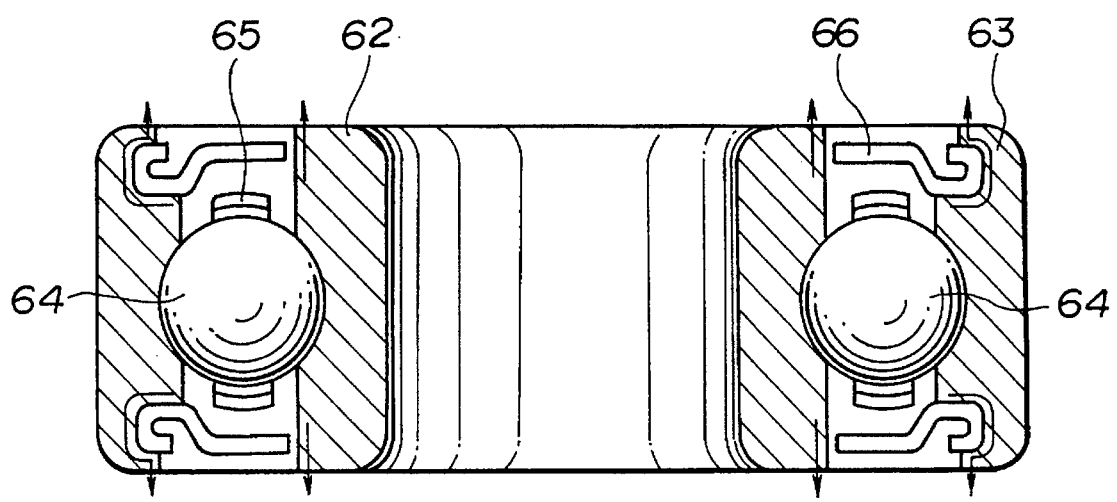
FIG. 4 is an enlarged cross-sectional view of a bearing portion as utilized in a tape guide mechanism.

Referring now to FIG. 1, generally, in such magnetic tape recording and/or reproducing apparatus utilizing such tape loading arrangements as described above, a pivotal arm 32 is moveably mounted on the base plate (not shown) for facilitating tape loading. Projecting from a distal end of the arm 32 a support shaft 31 is provided having a threaded end portion 31a.

At an upper side of the support shaft 31 a flange member 33 is provided having an enlarged circumferential ring portion 35 and a shaft section 34 projected from a lower side thereof. The threaded and portion 31a of the support shaft 31 is engaged with a threaded opening 34a provided through said flange member 33 and the shaft section 34 thereof.

A cylindrical roller guide 36 is disposed around said support shaft 31 to be held between a base of the support shaft 31 and the ring portion 35 of the flange 33 so as to be disposed coaxially with the support shaft 31 and to be rotatable relative thereto. The cylindrical roller guide 36 includes an outer tape contact surface 36a as described hereinabove in connection with the related art.

A cylindrical bearing pressing member 43 is disposed coaxially with the support shaft 31 between the support shaft 31 and the roller guide 36. The bearing pressing member meets the upper flange 40 at an upper side thereof and the upper bearing 37 at the lower side thereof.

The upper and lower sides of the support shaft 31 are respectively encircled by upper and lower bearings 37, 38. At upper and lower ends of the cylindrical roller guide 36 flanges 40, 41 are respectively provided retaining the upper and lower bearings 37, 38 therebetween. Fitting around a lower side of the support shaft 31 a flange spacer 44 is provided comprising a cylindrical spacer portion 44a and a flange ring portion 44b. Also, the flange spacer 44 is interposed between the lower edge of the lower flange 41 and the arm 32.

Further, a coil spring 45 is provided which is fitted around a base portion of the support shaft 31 between the arm 32 and the flange ring portion 44b of the flange spacer 44. The coil spring 45 pushes the flanges 40 and 41 in the upward direction and applies upward biasing pressure on the components of the tape guide mechanism engaged between the flange spacer and the flange 33. Further adjustment spacers 46, 47 may be normally provided in such a tape guide mechanism. The upper adjustment 46 spacer is positioned between a lower side of the bearing pressing member 45 and the upper bearing 37 while the lower adjustment spacer is positioned between an upper side of the lower flange 41 and the lower bearing 38.

As seen in FIG. 6(a) and 6(b) in the tape guide and signal recording arrangement according to the invention lubricant flow prevention members 71, 72 are provided adjacent inwardly facing ends of upper and lower bearing pressing members 43 and 51 respectively. The flow prevention members are annular rings affixed to an inner surface of the cylindrical roller guide 36.

Further, on a side of each of the flow prevention members 71, 72 which faces the upper and lower bearings 37, 38, an annular groove is formed for containing lubricant which may flow from the bearings 37, 38 along the inner surface of the roller guide 36. According to the present embodiment, the annular groove 71a, 72a may be V-shaped.

Further the letter 'e' in FIG. 6(b) designates the direction of lubricant flow along an inner surface of a lower side the roller guide. As may be seen, flow of the lubricant is surely stopped by the annular groove 71a, 72a of the flow prevention members 71, 72. That is, as mentioned above, when the tape recording and/or reproducing apparatus (not shown) in which the present tape guide mechanism is utilized is subjected to extended use, lubricant may be caused to flow from the bearing portions 37, 38 thereof. According to the invention, flow of lubricant to the tape contact surfaces, etc., is surely prevented.

Further, the depth and position of the annular grooves 71a, 72a are so formed that lubricant caught therein will not fly out according to rotation of the roller guide during operational use.

Figure 7:
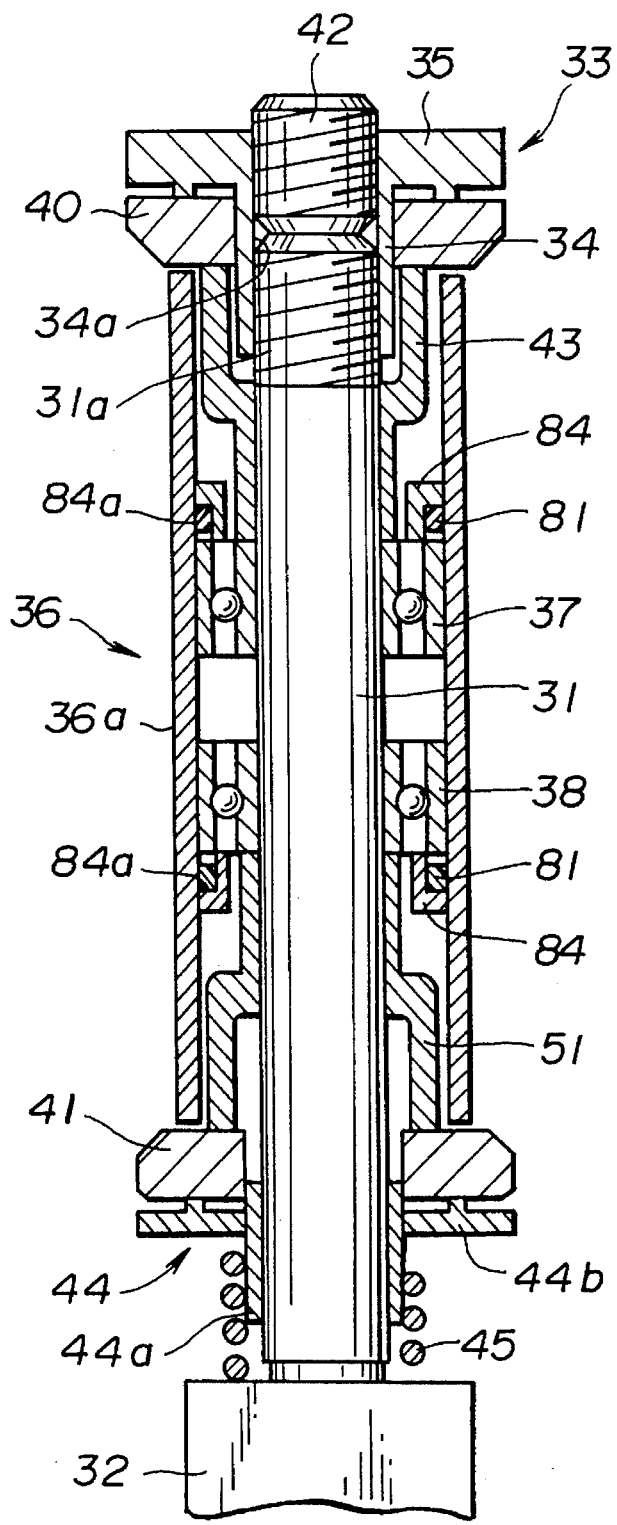
FIG. 7 shows a second embodiment of a tape guide mechanism according to the invention.
Figure 8:
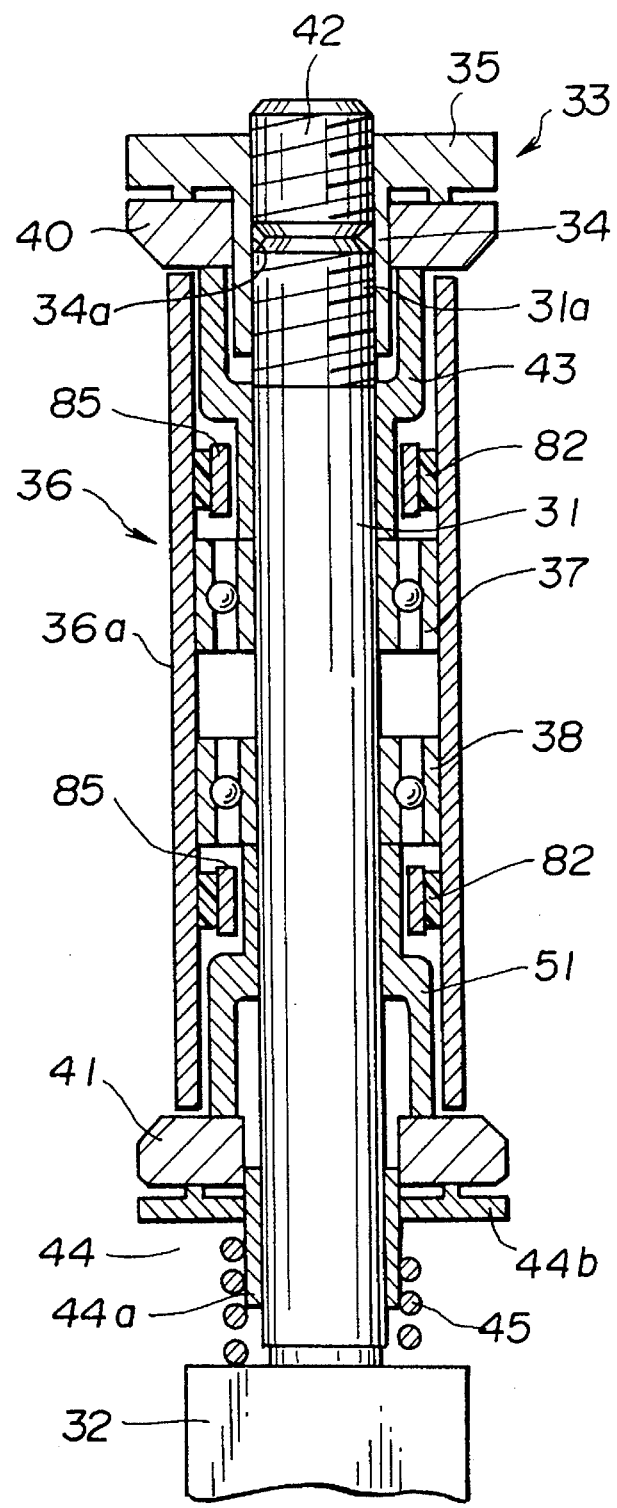
FIG. 8 shows a third embodiment of a tape guide mechanism according to the invention.
Figure 9:
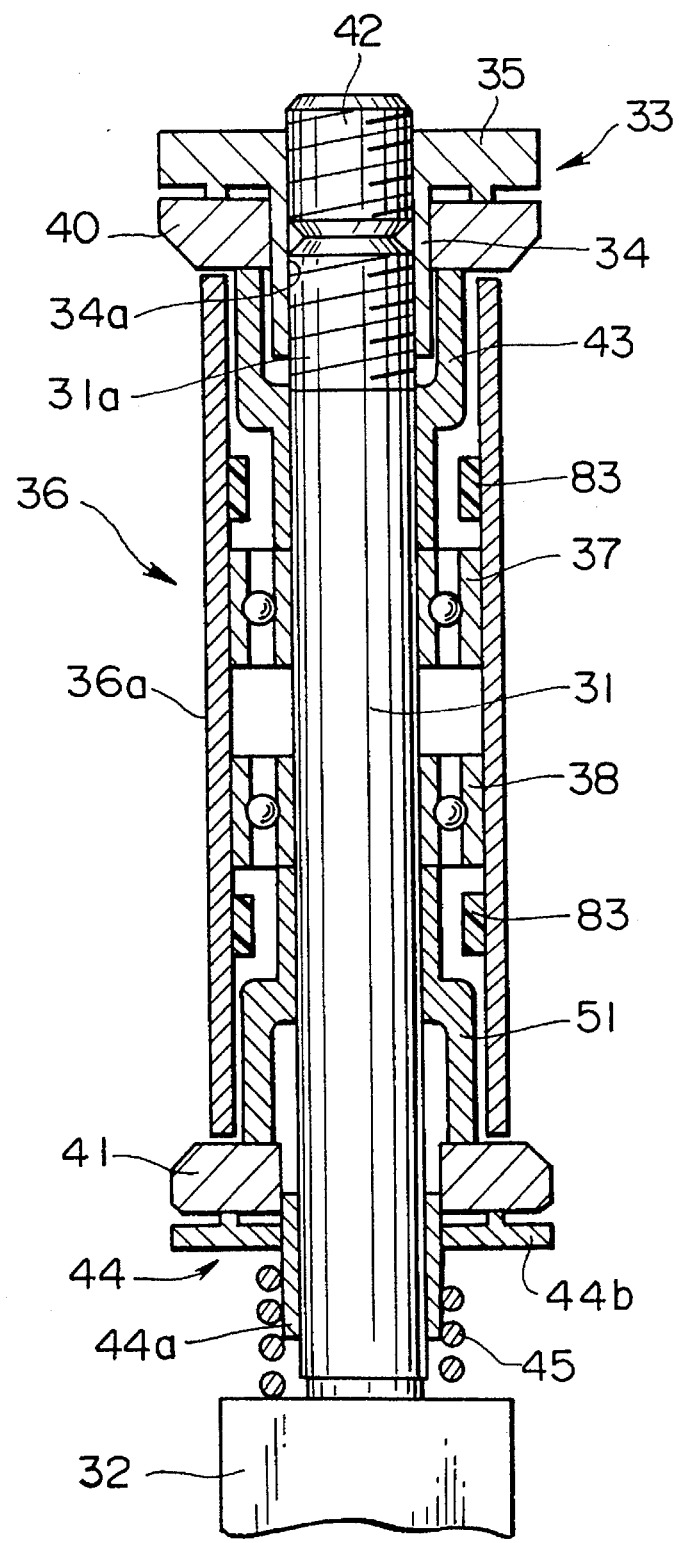
FIG. 9 shows a fourth embodiment of a tape guide mechanism according to the invention.

In addition, the invention is not limited to the flow prevention members 71, 72 of the present embodiment but, referring now to FIGS. 7–9, may alternatively be formed of as porous annular members of synthetic resin such as urethane, for example. By provision of such annular members 81–83 having porosity excess or leaked lubricant may be surely contained and increased working life and reliability is obtained.

Further to the above, referring to FIG. 7, the porous annular members 81 may be retained in annular flow prevention members 84, which according to the present embodiment are formed with an L-shaped cross-section such that the porous annular members are held in an annular groove 84a formed where the flow prevention members 84 are adhered to the inner wall of the roller guide 36.

In the embodiment of FIG. 8 it may be seen that the porous annular member 82 is firmly held against the inner wall of the roller guide 36 by the elastic properties of a flexible ring member 85 disposed at an inner periphery of the porous annular member 82 so as to apply expanding pressure thereto.

The lubricant absorbing member 83 of FIG. 9 is itself formed of an elastic material and is held firmly against the inner wall of the roller guide 36 by virtue of its own elasticity.

Thus, the structure of a tape guide and signal recording arrangement according to the invention as described above is effective to prevent leakage of lubricant from bearings 37, 38 of the tape guide mechanism along the inner wall of a roller guide member 36 or from reaching tape contact surfaces 36a of the roller guide member or upper and lower flanges 40, 41 of the tape guide.

Figure 10:
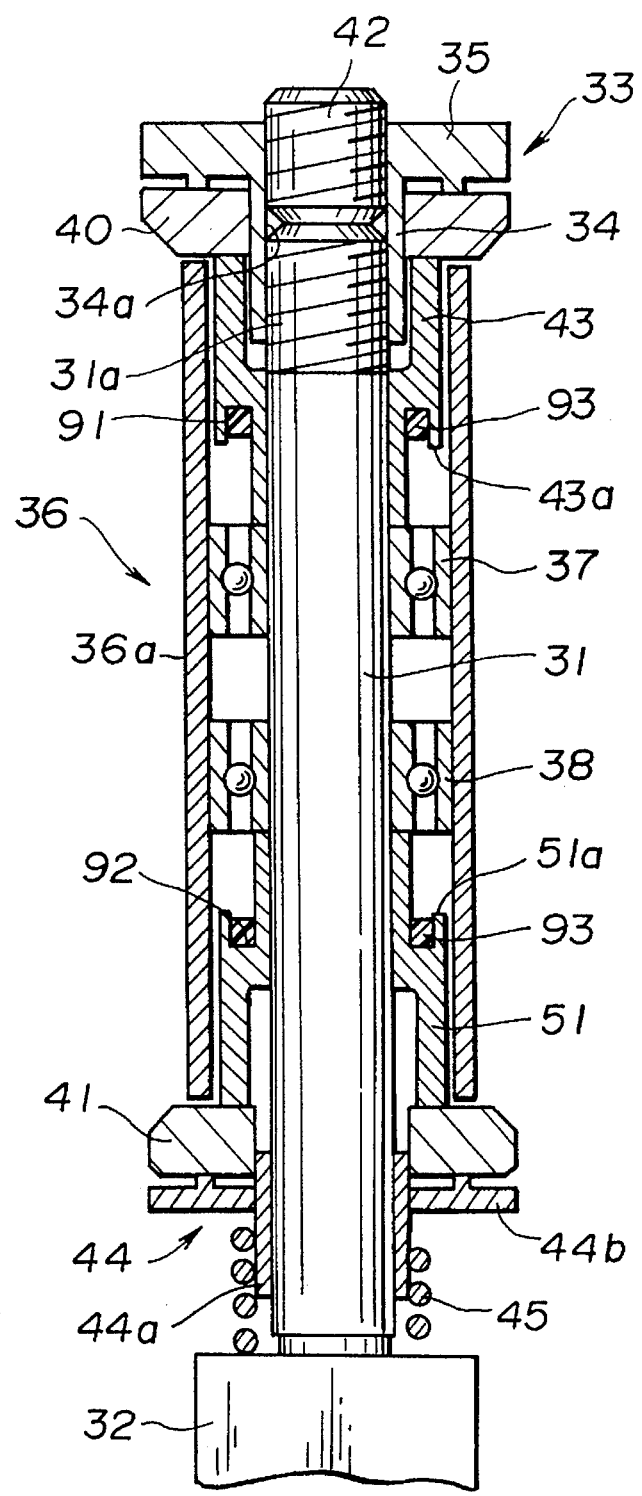
FIG. 10 shows a fifth embodiment of a tape guide mechanism according to the invention.

Next, a fifth embodiment of the invention will be set forth in detail describing a flow prevention arrangement for a tape guide mechanism for a case in which lubricant flow along an outer surface of a bearing pressing member is present, with reference to FIG. 10.

As noted above, a tape guide and signal recording arrangement such as that of the invention may be provided with cylindrical bearing pressing members 43, 51 at one or both of the upper and lower sides of the support shaft 31. According to the present embodiment, each of the bearing pressing members 43, 51 is formed with a step portion 43a, 51a forming ring shaped groove 91 in the upper bearing pressing member 43 and ring shaped groove 92 in the lower bearing pressing member 51. Each of the ring shaped grooves 91 and 92 are then filled with an annular lubricant absorbing member 93. Thus lubricant is prevented from running along the outer surface of the bearing pressing members 43, 51 and thus is prevented from being exposed to the tape contacting surfaces 36a of the roller guide 36 or the tape contacting portions of the upper and lower flanges 40, 41. Thus, performance and reliability of the tape recording and/or reproducing apparatus is enhanced according to provision of the tape guide and signal recording arrangement according to the invention.

Figure 11:
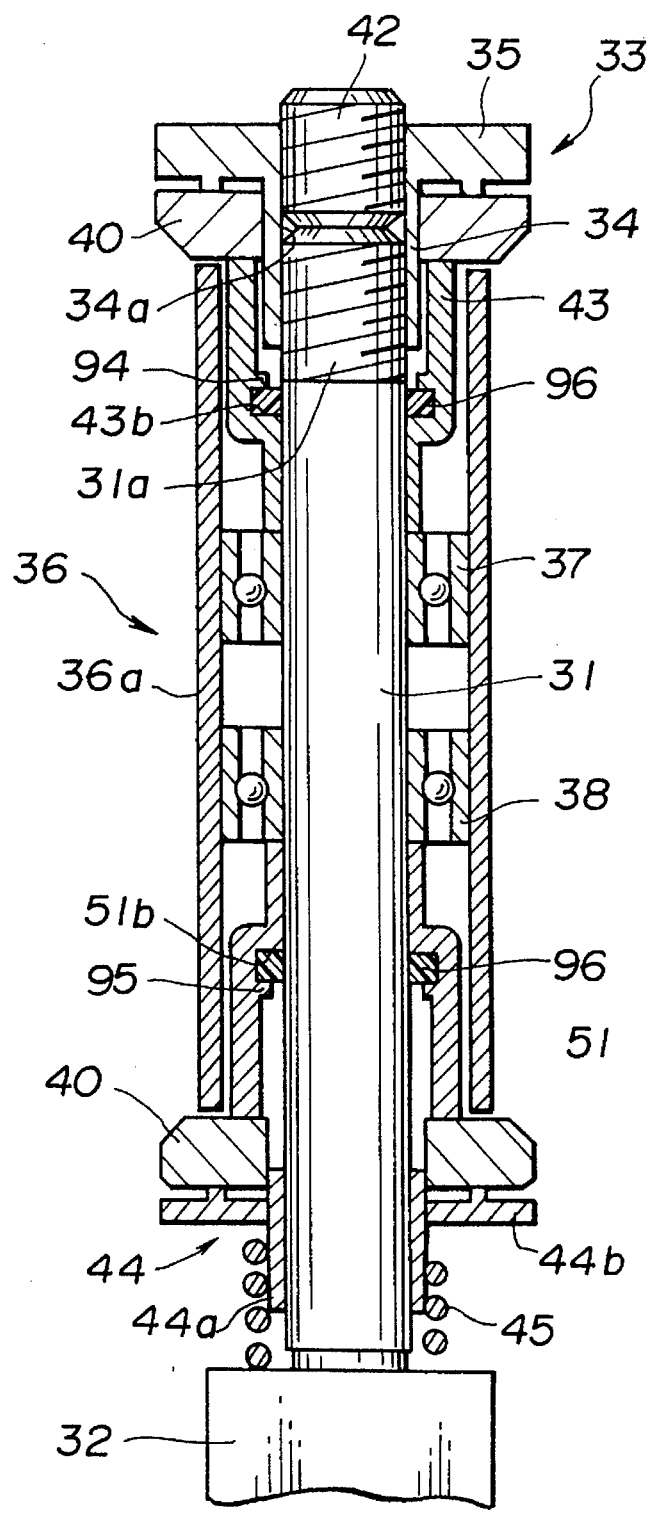
FIG. 11 shows a sixth embodiment of a tape guide mechanism according to the invention.

Additionally, a situation must be considered in which lubricant from the bearings 37, 38 is caused to flow along an outer surface of the support shaft 31, thus leaking under the bearing pressing members 43 and/or 51 along an inner surface thereof to escape at end portions of the support shaft, possibly to thereafter leak onto the tape contact surfaces of the flanges 40. 41 or the roller guide 36 so as to degrade performance of the tape recording and/or reproducing apparatus. In such case, the embodiment of FIG. 11 is provided. As may be seen from the drawing, according to this embodiment, the bearing pressing members 43, 51 are formed with small circumference portions and facing ends thereof having a circumference closely fitting the outer circumference of the support shaft 31 so as to fit snugly therearound. In addition, at ends thereof adjacent the flanges 40, 41, the bearing pressing members 43, 51 of the present embodiment have larger circumference poritons wherein a space is present between the inner wall of the bearing pressing member 4,3 51 and the outer wall of the support shaft 31.

At the stepped area between the smaller and larger circumference portions of the bearing pressing members 43, 51, and annular support rings 94, 95 are formed projected from the inner walls of the larger circumference portion of each of the bearing pressing members 43, 51 respectively. The annular support rings define annular grooves 43b and 51b in each of the bearing pressing members respectively and an annular lubricant absorbing member 96 is disposed in each of the grooves 43b, 51b retained by the support rings 94, 95. Thus, leakage of lubricant from either of the bearings 37, 38 along the outer surface of the support shaft 31 or along the inner surface of the bearing pressing members is surely prevented and working life and performance of the tape guide and signal recording arrangement is enhanced.

Figure 12:
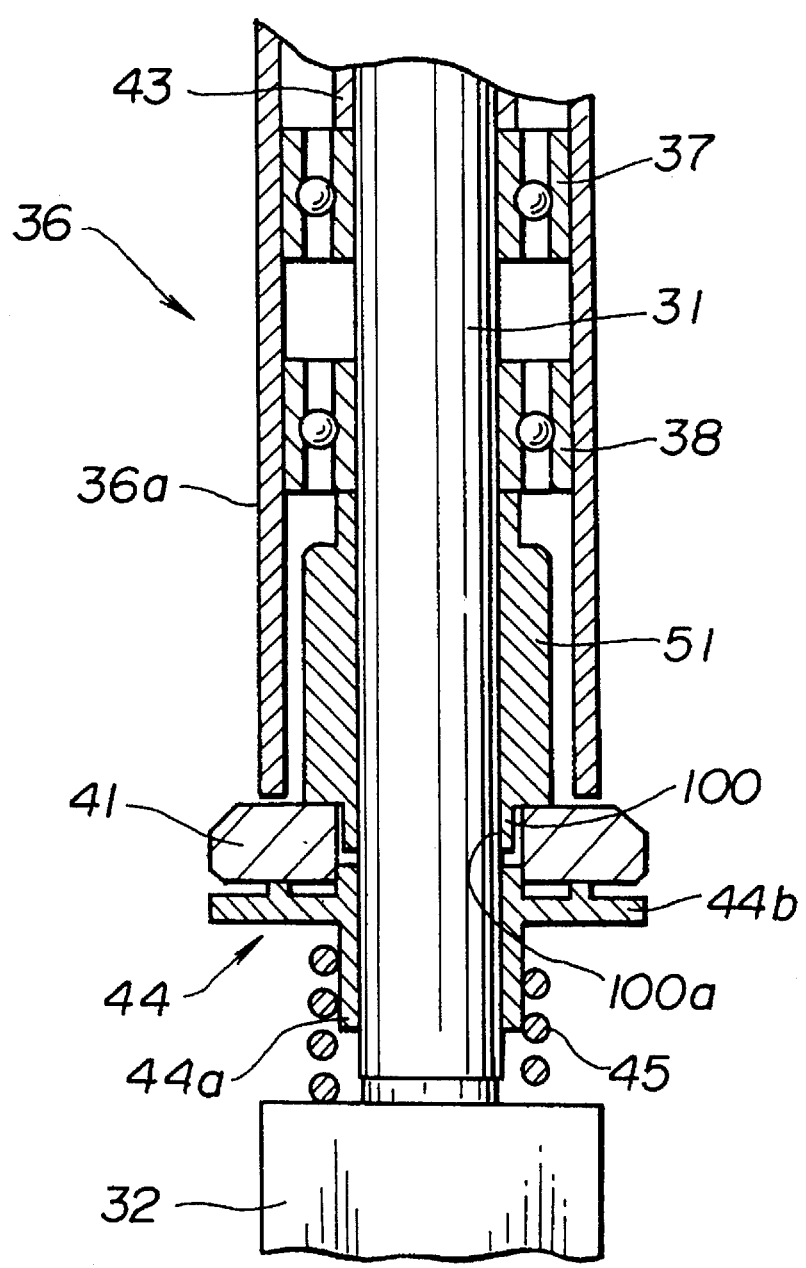
FIG. 12 shows a seventh embodiment of a tape guide mechanism according to the invention.

FIG. 12 shows another method of preventing lubricant flow from the inner side of the bearing pressing members 43, 51 and the outer side of the support shaft 31. According to this, a flow prevention member 100 having a lubricant absorbing surface 100a is integrally formed at a base edge of each of the bearing pressing members 43, 51 to be inserted into a inner opening of one of the upper and lower flanges 40, 41 respectively. According to this, the flow prevention members may be effectively and inexpensively provided.

Figure 13:
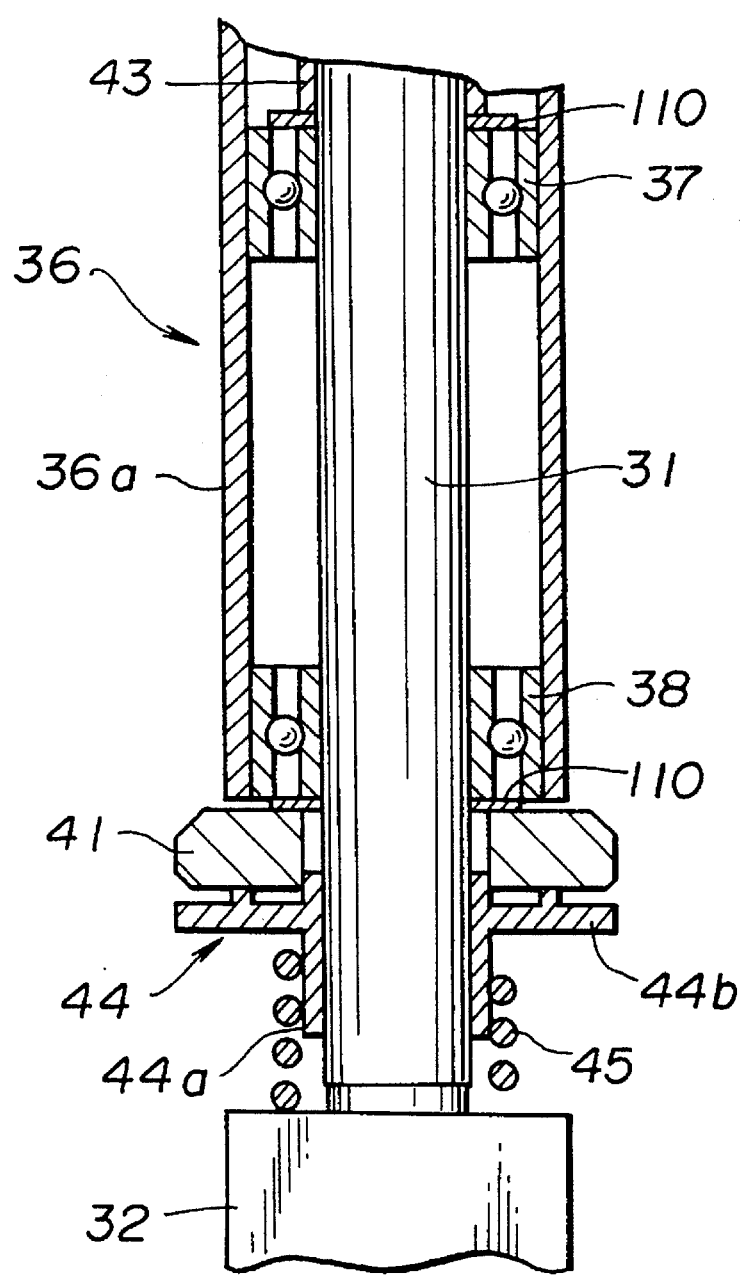
FIG. 13 shows an eighth embodiment of a tape guide mechanism according to the invention.

Referring now to FIG. 13, an alternative means of preventing lubricant flow from an outer surface of the support shaft 31 or from an inner surface of a bearing pressing member 43 or 51 is simple provision of an annular lubricant absorbing washer 110 at outward sides of the bearings 37, 38, immediately adjacent thereto. Such structure is particularly useful in a tape guide and signal recording arrangement such as described hereinabove wherein a lower bearing pressing member is not provided as the lubricant absorbing washer 110 may be provided between the bearing 37, 38 and the beaing pressing member 43, 51 or between the bearing 37, 38 and the flange 40, 41, as desired.

Figure 14:
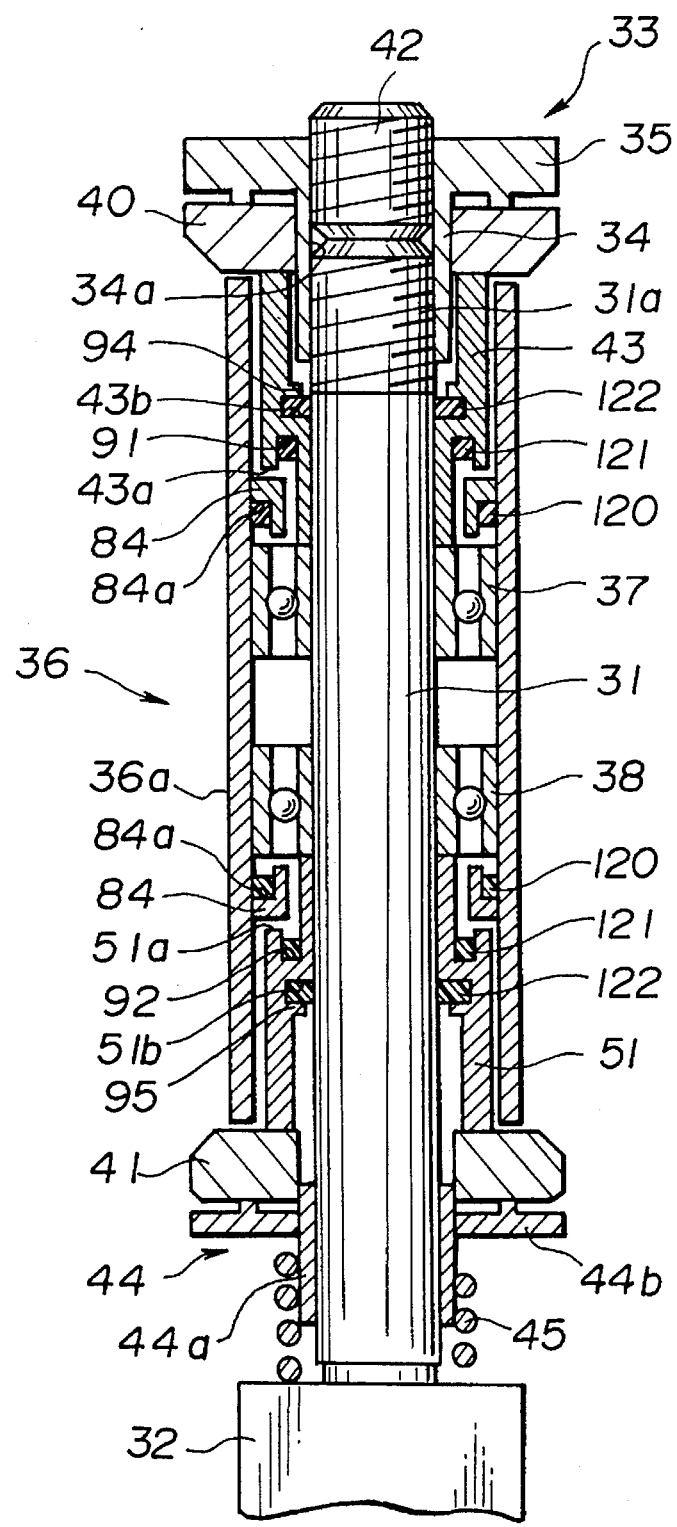
FIG. 14 shows a ninth embodiment of a tape guide mechanism according to the invention.

FIG. 14 shows an embodiment of the invention wherein three types of lubricant flow prevention means are provided at upper and lower sides of the tape guide mechanism respectively. According to this embodiment, lubricant flow of any kind is surely prevented from reaching the outside of the mechanism and tape contact surfaces are thus reliably protected from contamination due to lubricant leakage. According to this embodiment, the support structures of the embodiment shown in FIGS. 7, 10 and 11 are used for mounting annular lubricant absorbing members 120, 121, and 122 at both upper and lower sides of the tape guide mechanism. Thus, maximum reliability, longevity and operational quality may be assured.

Thus, according to the preferred embodiments of the present invention as described hereinabove, an improved tape guide and signal recording arrangement is provided wherein lubricant provided in bearing portions of the tape guide is surely prevented from leaking to tape contact portions of the tape guide and this overall efficiency, reliability and work life of a tape recording and/or reproducing apparatus is definitively enhanced.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A tape guide mechanism for a signal recording apparatus, comprising:

a support shaft having upper and lower ends and projected from a mounting base;

an upper flange engaged with a distal end of said support shaft and including a tape contact portion;

a lower flange coaxially disposed around a lower side of said support shaft proximate said base and including a tape contact portion;

a cylindrical roller guide disposed coaxially with the support shaft and rotatable relative thereto, disposed around said support shaft between said upper and lower flanges, said cylindrical roller guide including an outer tape contact surface and an inner wall;

bearing means provided between an outer wall of said support shaft and said inner wall of said cylindrical roller guide;

spring means provided between said base and a lower side of said lower flange so as to apply upward biasing pressure on components of the tape guide mechanism engaged between said upper and lower flanges; and annular lubricant flow prevention means provided between said bearing means and upper and lower ends of said tape guide mechanism, said lubricant flow prevention means positioned so as to intercept flow of lubricant between said bearing means and said tape contact surfaces of said upper and lower flanges and said cylindrical roller guide.

2. A tape guide mechanism as set forth in claim 1, wherein said bearing means includes upper and lower annular bearings respectively disposed around said support shaft between an outer surface of said support shaft and upper and lower sides of said inner wall of said roller guide.

3. A tape guide mechanism as set forth in claim 2, wherein said lubricant flow prevention means is provided between each of said upper and lower bearings and a proximate one of said upper and lower flanges.

4. A tape guide mechanism as set forth in claim 2, further including at least one cylindrical bearing pressing member disposed coaxially to the support shaft and positioned between the support shaft and the roller guide, said bearing pressing member vertically disposed between said upper flange at an upper side thereof and an upper side of said bearing means at a lower side thereof.

5. A tape guide mechanism as set forth in claim 4, wherein upper and lower bearing pressing members are provided.

6. A tape guide mechanism as set forth in claim 5, wherein said annular lubricant flow prevention means comprises lubricant absorbing washers disposed between one of said said bearings and an associated bearing pressing member.

7. A tape guide mechanism as set forth in claim 6, wherein said said lubricant absorbing washer is provided between a bearing and a flange proximate proximate thereto.

8. A tape guide mechanism as set forth in claim 4, wherein said wherein said lubricant flow prevention member is affixed to an inner side of said cylindrical roller guide at a position adjacent an end of a bearing pressing member which is closest to said bearing.

9. A tape guide mechanism as set forth in claim 4, wherein said bearing pressing member is formed with a step portion defining a first ring shaped groove therein, said ring shaped groove retaining said annular lubricant flow prevention means.

10. A tape guide mechanism as set forth in claim 4, wherein said said bearing pressing member is formed with small circumference portions closely fitting the outer circumference of the support shaft so as to fit snugly therearound and a larger circumference portion wherein a space is present between the inner wall of the bearing pressing member and the outer wall of said the support shaft such that a stepped is defined between the smaller and larger circumference portions of the bearing pressing member, and further including an annular support ring projected an inner wall of said larger circumference portion spaced from said stepped area and defining an annular groove in said bearing pressing member, said annular lubricant flow prevention means comprising an annular lubricant absorbing member being disposed in said groove, retained by said support ring.

11. A tape guide mechanism as set forth in claim 4, wherein said annular lubricant flow prevention means comrpising a flow prevention member having a lubricant absorbing surface integrally formed at a base edge of said bearing pressing member, a diameter of said flow prevention member being determined so as to allow insertion into an inner opening of said lower flange.

12. A tape guide mechanism as set forth in claim 1, wherein said base of said support shaft is a moveably mounted arm on a base plate of a tape loading arrangement.

13. A tape guide mechanism as set forth in claim 1, wherein said wherein said annular lubricant flow prevention means are annular rings affixed to an inner surface of the cylindrical roller guide.

14. A tape guide mechanism as set forth in claim 13, wherein said wherein said annular rings include an annular groove formed facing said bearing means for containing lubricant flow from the bearing along said inner wall of the roller guide.

15. A tape guide mechanism as set forth in claim 14, wherein said wherein said annular groove is V-shaped.

16. A tape guide mechanism as set forth in claim 14, wherein dimensions of said groove are so determined such that lubricant contained therein will not spill under normal operational rotation conditions of said tape guide mechanism.

17. A tape guide mechanism as set forth in claim 1, wherein said wherein said annular lubricant flow prevention means includes an annular member having a porous structure.

18. A tape guide mechanism as set forth in claim 17, wherein said wherein said annular member is formed of synthetic resin.

19. A tape guide mechanism as set forth in claim 17, wherein said wherein said annular member is formed of urethane.

20. A tape guide mechanism as set forth in claim 17, wherein said wherein said annular member is retained in a groove formed in an annular member affixed to said inner wall of said roller guide.

21. A tape guide mechanism as set forth in claim 17, wherein said annular member is firmly held against the inner wall of the roller guide by elastic properties of a flexible ring member disposed at an inner periphery of the porous annular member coaxially therewith and so as to apply expanding pressure thereto.

22. A tape guide mechanism as set forth in claim 1, wherein said annular flow prevention means comprises a lubricant absorbing member formed of elastic material and held firmly against the inner wall of the roller guide by its own elasticity.

23. A tape guide mechanism as set forth in claim 1, wherein said annular lubricant flow prevention means comprises annular lubricant absorbing washers provided at outer sides of said bearing means immediately adjacent thereto.

24. A tape guide mechanism as set forth in any one of claims 1 to 23, wherein said wherein a plurality of lubricant flow prevention means are provided at upper and lower sides of the tape guide mechanism.

25. A signal recording and/or playback apparatus utilizing magnetic tape, comprising:

A head drum rotatably mounted on said apparatus and operable in a least one of a first mode for recording information signals to said magnetic tape and a second mode for reading information signals from said magnetic tape;

at least one cylindrical tape guide mechanism rotatably disposed proximate said head drum and active to guide said magnetic tape along a predetermined path of tape travel, said tape guide mechanism including:

a support shaft having upper and lower ends and projected from a mounting base;

an upper flange engaged with a distal end of said support shaft and including a tape contact portion;

a lower flange coaxially disposed around a lower side of said support shaft proximate said base and including a tape contact portion;

a cylindrical roller guide disposed coaxially with the support shaft and rotatable relative thereto, disposed around said support shaft between said upper and lower flanges, said cylindrical roller guide including an outer tape contact surface and an inner wall;

bearing means provided between an outer wall of said support shaft and said inner wall of said cylindrical roller guide;

spring means provided, between said base and a lower side of said lower flange so as to apply upward biasing pressure on components of the tape guide mechanism engaged between said upper and lower flanges; and annular lubricant flow prevention means provided between said bearing means and upper and lower ends of said tape guide mechanism, said lubricant flow prevention means being mounted on said inner wall of said cylindrical roller guide and positioned so as to intercept flow of lubricant between said bearing means and said tape contact surfaces of said upper and lower flanges and said cylindrical roller guide.

\* \* \* \* \*